United States Patent
Pan et al.

(10) Patent No.: US 11,398,751 B2
(45) Date of Patent: Jul. 26, 2022

(54) WIRELESS CHARGING TRANSMITTER AND METHOD FOR ENSURING SAFETY OF LIVING BODY IN WIRELESS CHARGING SCENE

(71) Applicant: BEIJING XIAOMI MOBILE SOFTWARE CO., LTD., Beijing (CN)

(72) Inventors: Yajun Pan, Beijing (CN); Shujun Wei, Beijing (CN); Jian Bai, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 149 days.

(21) Appl. No.: 16/809,276

(22) Filed: Mar. 4, 2020

(65) Prior Publication Data

US 2021/0135505 A1    May 6, 2021

(30) Foreign Application Priority Data

Nov. 4, 2019    (CN) .......................... 201911067264.8

(51) Int. Cl.
    *H02J 50/60*    (2016.01)
    *H02J 50/10*    (2016.01)

(52) U.S. Cl.
    CPC .............. *H02J 50/60* (2016.02); *H02J 50/10* (2016.02)

(58) Field of Classification Search
    CPC ................................. H02J 50/60; H02J 50/10
    USPC ................................................ 320/108, 109
    See application file for complete search history.

(56) References Cited

U.S. PATENT DOCUMENTS

| | | | |
|---|---|---|---|
| 2012/0200151 A1* | 8/2012 | Obayashi | B60L 53/305 |
| | | | 307/104 |
| 2013/0249682 A1 | 9/2013 | Van Wiemeersch et al. | |
| 2015/0303701 A1 | 10/2015 | Terao | |
| 2015/0306963 A1 | 10/2015 | Van Wiemeersch et al. | |
| 2015/0323694 A1* | 11/2015 | Roy | H02J 50/70 |
| | | | 307/104 |

(Continued)

FOREIGN PATENT DOCUMENTS

| | | | | |
|---|---|---|---|---|
| DE | 10 2017 006 156 A1 | 12/2017 | | |
| DE | 102017006156 A1 * | 12/2017 | ............. | H02J 50/60 |

(Continued)

OTHER PUBLICATIONS

European Search Report dated May 6, 2020 in corresponding European application No. 20162751.0, 9 pages.

*Primary Examiner* — Richard Isla
*Assistant Examiner* — Manuel Hernandez
(74) *Attorney, Agent, or Firm* — Oblon, McClelland, Maier & Neustadt, L.L.P.

(57) ABSTRACT

A wireless charging transmitter, a method for wireless charging, and a storage medium. The method can be applied to a transmitting component for transmitting a wireless charging signal to a terminal to be charged to wirelessly charge the terminal. A detection component can be configured to detect whether there is a living body that has entered a preset range associated with the wireless charging transmitter and generate a detection signal. An adjustment component can be connected to the transmitting component and configured to adjust a first transmitting power of the transmitting component to a second transmitting power when the detection signal indicates that there is a living body that has entered the preset range, the second transmitting power is smaller than the first transmitting power.

15 Claims, 6 Drawing Sheets

(56) References Cited

U.S. PATENT DOCUMENTS

| | | | |
|---|---|---|---|
| 2017/0077735 A1* | 3/2017 | Leabman | H02J 50/20 |
| 2017/0259682 A1 | 9/2017 | Oettle et al. | |
| 2017/0355275 A1 | 12/2017 | Kwasnick et al. | |
| 2018/0301937 A1* | 10/2018 | Park | H02J 50/60 |
| 2018/0316229 A1* | 11/2018 | Anwer | H02J 50/60 |
| 2020/0161905 A1* | 5/2020 | Fechting | H02J 50/60 |

FOREIGN PATENT DOCUMENTS

| | | | |
|---|---|---|---|
| FR | 3 067 181 A1 | 12/2018 | |
| FR | 3067181 A1 * | 12/2018 | H02J 50/10 |
| KR | 10-2013-0068921 A1 | 6/2013 | |
| KR | 20130068921 A * | 6/2013 | H02J 50/40 |

\* cited by examiner

WIRELESS CHARGING TRANSMITTER AND METHOD FOR ENSURING SAFETY OF LIVING BODY IN WIRELESS CHARGING SCENE

CROSS-REFERENCE TO RELATED APPLICATIONS

This application is based upon and claims priority to Chinese Patent Application No. 201911067264.8, filed on Nov. 4, 2019, the entire contents of which are incorporated herein by reference.

TECHNICAL FIELD

The disclosure relates to an electronic technology, and more particularly, to a wireless charging transmitter, a method for wireless charging, and a storage medium.

BACKGROUND

With the gradually widespread and in-depth application of intelligent electronic devices and the Internet of Things (IOT) devices, a wireless charging technology has been greatly developed, and has shown a trend of accelerated commercialization among mainstream intelligent electronic devices and IOT devices. Related technologies include a Wireless Power Consortium (WPC) standard based on an electromagnetic induction wireless charging technology, and an AirFuel Alliance (AFA) standard based on a magnetic resonance technology. The electromagnetic induction wireless charging technology has been widely used.

The wireless charging technologies based on electromagnetic induction and magnetic resonance are both applied to short-distance wireless charging scenarios within 5 mm. In a long-distance wireless charging scenario, a high-power radiation signal is required.

SUMMARY

The disclosure provides a wireless charging transmitter, a method for wireless charging, and a storage medium. In a long-distance wireless charging scenario, reducing the impact of radiation on human safety is a technical problem.

According to a first aspect of embodiments of the disclosure, a wireless charging transmitter is provided. The wireless charging transmitter can include a transmitting component that is configured to transmit a wireless charging signal to a terminal to be charged to wirelessly charge the terminal, a detection component that is configured to detect whether there is a living body that has entered a preset range associated with the wireless charging transmitter, and generate a detection signal, and an adjustment component that is coupled to the transmitting component and can be configured to adjust a first transmitting power of the transmitting component to a second transmitting power when the detection signal indicates that there is a living body that has entered the preset range. The second transmitting power is smaller than the first transmitting power.

In some embodiments, the wireless charging transmitter may further include a ranging component, which is connected to the adjustment component and configured to detect a first distance between the living body and the wireless charging transmitter. The adjustment component may be further configured to generate a trigger signal when the detection signal indicates that there is a living body that has entered the preset range, and send the trigger signal to the ranging component.

The ranging component may be further configured to transmit, based on the trigger signal, a ranging signal and receive a reflected signal of the ranging signal, and determine the first distance based on the ranging signal and the reflected signal. The adjustment component may be further configured to determine the second transmitting power based on the first distance.

In some embodiments, the ranging signal may include a first laser signal, the reflected signal may include a second laser signal, and the ranging component can include a laser generator that is configured to transmit the first laser signal in a direction of the living body, a laser receiver that is configured to receive the second laser signal which is reflected, and a processing unit that is configured to determine the first distance between the living body and the wireless charging transmitter according to a transmitting time of the first laser signal and a receiving time of the second laser signal.

In some embodiments, the adjustment component may determine the second transmitting power corresponding to the first distance according to preset correspondence between distances and transmitting powers.

In some embodiments, the detection component may include a detection sensor that is configured to detect a sensing signal of a living body within a preset range associated with the wireless charging transmitter, and a signal conversion circuit that is connected to the detection sensor and configured to convert the sensing signal into the detection signal. The detection sensor may include: an infrared sensor, configured to detect an infrared signal radiated by a living body within a preset range associated with the wireless charging transmitter.

According to a second aspect of the embodiments of the disclosure, a method for wireless charging can be provided. The method may be applied to a wireless charging transmitter. The method can include transmitting a wireless charging signal to a terminal to be charged to wirelessly charge the terminal, detecting whether there is a living body that has entered a preset range associated with the wireless charging transmitter, generating a detection signal, and adjusting a first transmitting power of the wireless charging signal to a second transmitting power when the detection signal indicates that there is a living body that has entered the preset range. The second transmitting power is smaller than the first transmitting power.

In some embodiments, the method may further include generating a trigger signal when the detection signal indicates that there is a living body that has entered the preset range, transmitting, based on the trigger signal, a ranging signal and receiving a reflected signal based on the ranging signal, determining a first distance between the living body and a wireless charger based on the ranging signal and the reflected signal, and determining the second transmitting power based on the first distance.

In some embodiments, an operation of determining the second transmitting power based on the first distance may include an operation of determining the second transmitting power corresponding to the first distance according to preset correspondence between distances and transmitting powers.

In some embodiments, the ranging signal may include a first laser signal, the reflected signal may include a second laser signal, and the operation of determining a first distance between the living body and a wireless charger based on the ranging signal and the reflected signal may include the following operations: transmitting the first laser signal in a direction of the living body, receiving the second laser signal which is reflected; and determining a first distance between the living body and the wireless charging transmitter according to a transmitting time of the first laser signal and a receiving time of the second laser signal.

The operation of detecting whether there is a living body that has entered a preset range associated with the wireless charging transmitter and generating a detection signal may include operations of detecting a sensing signal of a living body within a preset range associated with the wireless charging transmitter and converting the sensing signal into the detection signal.

In some embodiments, the operation of detecting a sensing signal of a living body within a preset range associated with the wireless charging transmitter may include an operation of detecting an infrared signal radiated by a living body within a preset range associated with the wireless charging transmitter.

According to a third aspect of the embodiments of the disclosure, a non-transitory computer-readable storage medium having stored therein instructions that, when executed by a wireless charging transmitter, causes the wireless charging transmitter to perform the method for wireless charging in the second aspect.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
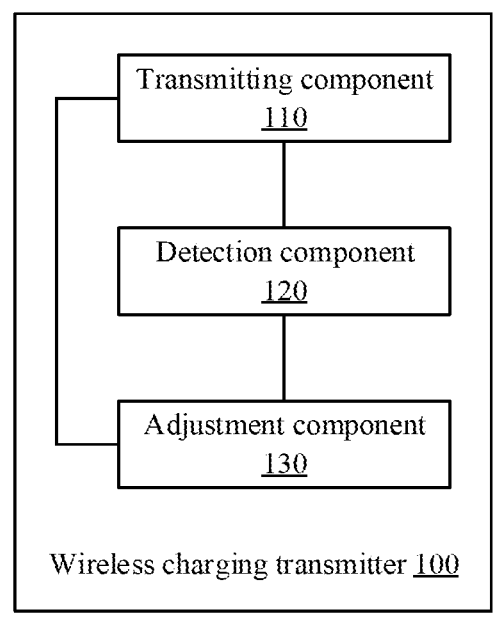
FIG. 1 illustrates an exemplary structural block diagram of a wireless charging transmitter, according to some embodiments.

FIG. 1 illustrates an exemplary structural block diagram of a wireless charging transmitter, according to some embodiments. As shown in FIG. 1, the wireless charging transmitter 100 includes a transmitting component 110, a detection component 120, and an adjustment component 130.

The transmitting component 110 is configured to transmit a wireless charging signal to a terminal to be charged in order to wirelessly charge the terminal.

The detection component 120 is configured to detect whether there is a living body that has entered a preset range associated with the wireless charging transmitter. Further, the detection component can generate a detection signal indicative of whether a living body is detected.

The adjustment component 130 is connected to the transmitting component 110 and configured to adjust a first transmitting power of the transmitting component 110 to a second transmitting power when the detection signal indicates that there is a living body that has entered the preset range. The second transmitting power is smaller than the first transmitting power.

Here, the wireless charging transmitter is a long-distance wireless charging transmitter, and specifically may be a transmitter based on an RF long-distance wireless charging scheme. The wireless charging transmitter is configured to provide a wireless RF signal to a terminal to be charged to implement wireless charging to the terminal to be charged. The terminal to be charged can include various electronic devices with a rechargeable battery, and the terminal to be charged has a wireless charging receiving component for receiving a wireless RF signal and converting energy carried in the wireless RF signal into electrical energy. For example, the terminal to be charged can include IOT devices such as cleaning robots, smart rice cookers, smart speakers, and other smart home devices; smart communication devices such as mobile phones, tablets, personal computers, and smart watches; non-smart electronic devices such as electronic clocks, electronic calendars and household appliances; and the like.

The wireless charging transmitter may wirelessly charge the terminal to be charged under a certain distance from the terminal to be charged. For example, the wireless charging transmitter may wirelessly charge the terminal to be charged within a range of 5 m.

Because the wireless charging transmitter needs to charge the terminal to be charged remotely, before a wireless RF signal transmitted by the wireless charging transmitter reaches the terminal to be charged, there may be a certain loss in the process of propagation. Therefore, the wireless charging transmitter is required to provide an RF signal with a higher transmitting power, that is, the first transmitting power, so as to ensure that the signal intensity reaching the terminal to be charged is sufficient to provide charging energy. The first transmitting power may be set according to a charging requirement of the terminal to be charged.

However, when a living body, such as a human body, is exposed to the first transmitting power, the living body will be radiated by a higher-power RF signal, and there may be hidden dangers to health and safety that could cause health problems, such as human diseases. Moreover, the RF signal of the first transmitting power may not meet safety regulations regarding the intensity of RF signals that can be exposed to a human body.

Therefore, here, the detection component provided on the wireless charging transmitter is used to detect whether a living body enters a preset range. When a living body enters the preset range, the transmitting power is adjusted to a second transmitting power by the adjustment component. The second transmitting power may be a power that complies with the health and safety regulations of the living body, thereby reducing the radiation of RF signals to the living body. The preset range may be a range within a preset radius centered on the wireless charging transmitter.

By means of the technical solution, a detection component is provided on a wireless charging transmitter to detect whether there is a living body within a preset range associated with the wireless charging transmitter to adjust a transmitting power of a transmitting component correspondingly. In this way, when no living body is detected, the wireless charging transmitter may wirelessly charge terminals to be charged by using a higher transmitting power namely a first transmitting power, thereby achieving wireless charging of more charged devices in a long distance and ensuring the overall charging efficiency of the wireless charging transmitter. When a living body is detected, the transmitting power is adjusted to a lower second transmitting power, thereby remotely charging the charged device while improving the safety of long-distance wireless charging and reducing the probability of exposure of the living body to a high-power wireless RF signal.

Figure 2:
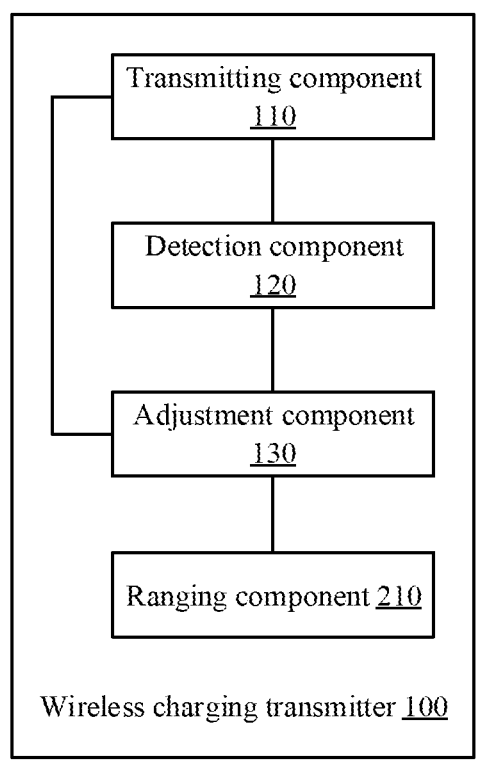
FIG. 2 illustrates an exemplary structural block diagram of another wireless charging transmitter, according to some embodiments.

In some embodiments, as shown in FIG. 2, the wireless charging transmitter 100 further includes a ranging component 210, which is connected to the adjustment component 130 and configured to detect a first distance between the living body and the wireless charging transmitter.

In some embodiments, the adjustment component 130 can be further configured to generate a trigger signal when the detection signal indicates that there is a living body that has entered the preset range, and send the trigger signal to the ranging component 210.

The ranging component 210 can be further configured to transmit, based on the trigger signal, a ranging signal and receive a reflected signal of the ranging signal, and determine the first distance based on the ranging signal and the reflected signal.

The adjustment component 130 can be further configured to determine the second transmitting power based on the first distance.

The detection signal is an electrical signal correspondingly generated by the detection component 120 according to a signal that detects whether a living body exists. When a living body enters the preset range, the detection signal carries information regarding that the living body enters the preset range, for example, information about a direction of the living body relative to a wireless charging device and/or a preliminary detection position. When the detection component 120 provides the detection signal to the adjustment component 130, the adjustment component 130 generates a trigger signal correspondingly based on the information, regarding that the living body enters the preset range, in the detection signal.

The trigger signal is generated only when it is detected that a living body has entered the preset range, and is provided to the ranging component 210. When the ranging component 210 receives the trigger signal, a corresponding ranging signal is transmitted to measure the first distance between the living body and the wireless charging transmitter.

The ranging method may obtain the first distance between the wireless charging transmitter and the living body by sending a ranging signal and then receiving a reflected signal, and performing operation processing based on the ranging signal and the reflected signal.

The ranging component 210 may include a component using a ranging mode such as an optical principle, an acoustic principle, or image processing. For example, in a laser ranging mode, continuous laser or laser pulse output is used to determine a distance from a measured object by detecting parameters such as phase change, energy change and reflection time of reflected light. For another example, in an ultrasonic ranging mode, an ultrasonic wave is sent to a measured object and the ultrasonic wave reflected by the measured object is received. The distance from the measured object is determined by a time difference between the moment at which the ultrasonic wave is sent and the moment at which the reflected ultrasonic wave is received and a transmission speed of the ultrasonic wave. In addition, an image processing mode may also be used for ranging. For example, a camera device with a depth parameter is adopted to shoot a measured object and extract the depth parameter from an image to calculate a distance from the measured object.

In some embodiments, the detection component 120 can be configured to determine, when detecting that a living body has entered the preset range, a first orientation of the living body. The ranging component sends a ranging signal according to the first orientation, detects the first distance, and determines a second orientation according to the first distance. The accuracy of the second orientation is higher than that of the first orientation.

The detection component 120 may determine, when detecting that a living body has entered the preset range, a direction or approximate position of the living body, and correspondingly generate a detection signal carrying the direction or position information of the living body. When the ranging component 210 performs ranging, the ranging signal is sent by using the direction or position information of the living body as an initial position. In this way, the ranging component 210 only needs to send a ranging signal to a specified direction, and does not need to send a ranging signal in all directions, thereby reducing power consumption, improving detection efficiency, and facilitating rapid ranging.

Because there may be a large deviation when the detection component 120 determines the direction or approximate position of the living body, the ranging component 210 cannot detect an accurate distance based on the direction or position. Therefore, during the ranging process, the ranging component 210 may adjust the direction and perform detection within a certain range of directions. For example, when the detection component 120 provides a detection signal with a first direction, the ranging component 210 adjusts an angle of a predetermined value in a horizontal direction based on the first direction and centered on the ranging component 210, such as ±20°, and performs detection within the range to achieve the purpose of accurate detection.

In some embodiments, the ranging component 210 performs ranging according to a first orientation in a detection signal at a first moment, and determines a first distance and a second orientation to obtain a first set; and the ranging component 210 performs ranging again according to a first orientation in a detection signal at a second moment, and determines a first distance and a second orientation to obtain a second set. The ranging component 210 determines a tracking direction according to a positional relationship between the second orientation in the first set and the second orientation in the second set, and then tracks and detects the living body according to the tracking direction.

Because a living body may be in the process of continuous movement, the detection component 120 may track a target when the living body is detected, dynamically adjust a transmitting direction of a ranging signal, and then adjust the transmitting power of the transmitting component in real time until the detection component determines that the living body has left a preset range, so that real-time dynamic adjustment of the transmitting power is realized.

The adjustment component 130 determines a second transmitting power according to the first distance, and adjusts the transmitting power of the transmitting component to the second transmitting power. That is, the intensity of the second transmitting power may be determined by the distance between the living body and the wireless charging transmitter. For example, correspondence between second transmitting powers and first distances may be set. As the first distance is longer, the intensity of the second transmitting power may be higher. As the first distance is shorter, the intensity of the second transmitting power may be lower. In this way, the wireless charging transmitter may dynamically adjust the transmitting power to minimize the radiation impact on the living body.

Of course, the second transmitting power may also be a fixed preset value determined based on the distance between the living body and the wireless charging transmitter. For example, when the first distance is less than a preset distance threshold, the transmitting power of the transmitting component is adjusted to the second transmitting power. Otherwise, no adjustment is made.

Through the above method, a distance between the living body and the wireless charging transmitter is measured, and the corresponding second transmitting power is determined according to the distance. When no living body is detected, distance measurement and power adjustment are not required, thereby reducing the amount of calculation and the load of adjustment components.

In some embodiments, the ranging signal includes a first laser signal, the reflected signal includes a second laser signal, and the ranging component includes a laser generator, a laser receiver and a processing unit. The laser generator is configured to transmit the first laser signal in a direction of the living body. The laser receiver is configured to receive the second laser signal which is reflected.

The processing unit is configured to determine the first distance between the living body and the wireless charging transmitter according to a transmitting time of the first laser signal and a receiving time of the second laser signal.

Here, an implementation scheme of a ranging component is provided, and a laser ranging mode is adopted to realize the measurement of a distance between a living body and a wireless charging transmitter. The ranging component 210 includes a laser generator, which may transmit a first laser signal to a living body as a ranging signal. The living body reflects the laser signal back to a laser receiver. A processing unit performs calculation and processing on the first laser signal and a second laser signal which is reflected, to obtain the first distance.

Here, a time difference may be determined from the transmitting time of the first laser signal and the receiving time of the second laser signal, and the first distance may be calculated from the time difference and the speed of light propagation in the air.

According to the method for implementing laser ranging, the first distance may also be calculated by using a phase difference between the second laser signal and the first laser signal. Alternatively, the first distance may also be calculated by using an area of a beam of the first laser signal and a beam of the second laser signal. In addition, distance measurement may also be achieved through other modes such as image acquisition and processing. The embodiments of the disclosure only provide a description of the ranging principle of the ranging component by way of example, and do not limit the ranging mode of the ranging component of the wireless charging transmitter.

In some embodiments, the adjustment component 130 may also determine the second transmitting power corresponding to the first distance according to preset correspondence between distances and transmitting powers. Here, the correspondence between distances and transmitting powers preset in the wireless charging transmitter may be: a relationship curve between distances and transmitting powers, or a list of relationships between different distance ranges and corresponding transmitting powers, and the like. Based on the first distance determined by the ranging component, the preset correspondence is used to determine the second transmitting power.

In some embodiments, the detection component 120 includes a detection sensor and a signal conversion circuit. The detection sensor is configured to detect a sensing signal of a living body within a preset range associated with the wireless charging transmitter. The signal conversion circuit is connected to the detection sensor and configured to convert the sensing signal into the detection signal.

The detection component may detect a sensing signal radiated by a living body through a detection sensor, or identify a living body within a preset range by using a sensing signal generated according to the characteristics of the living body. For example, an activity status of a living body is acquired through image acquisition, or a temperature signal of a living body is collected through a temperature sensor. For another example, an infrared spectrum in an environment is acquired through an infrared sensor, it is analyzed, based on the characteristics of an infrared signal radiated by a living body, to determine whether a living body exists and the orientation of the living body.

After the detection sensor obtains the sensing signal of the living body, the sensing signal may be converted into an electrical signal through a signal conversion circuit and provided as the detection signal to other components such as the adjustment component to indicate that there is a living body that has entered the preset range.

In addition, the detection sensor may also continuously detect signals in the environment, such as collected images or infrared spectra detected in the environment. The signal conversion circuit also performs conversion continuously according to the signals provided by the detection sensor to generate continuous electrical signals. When a living body exists within a preset range, the recognition of the living body within the preset range may be determined through specific parameters in an electrical signal, such as an intensity or frequency change of voltage or current.

In some embodiments, the detection sensor includes an infrared sensor, which is configured to detect an infrared signal radiated by a living body within a preset range associated with the wireless charging transmitter. The detection sensor may be an infrared sensor, which recognizes a living body in an environment according to the principle of infrared detection. A temperature radiated out by the living body is generally higher than the temperature of other objects in the environment, or the temperature radiated by the living body is within a specific range. An infrared spectrum corresponding to radiated infrared rays can be obtained by detecting an indoor temperature and a temperature change through infrared detection. By analyzing the infrared spectrum, it may be determined whether a living body exists within a preset range.

The infrared sensor can detect infrared rays radiated by the living body in real time. That is, an infrared detection biometric technology is applied to the wireless charging transmitter in the embodiments of the disclosure, thereby providing a basis for the power adjustment of the wireless charging transmitter.

Figure 3:
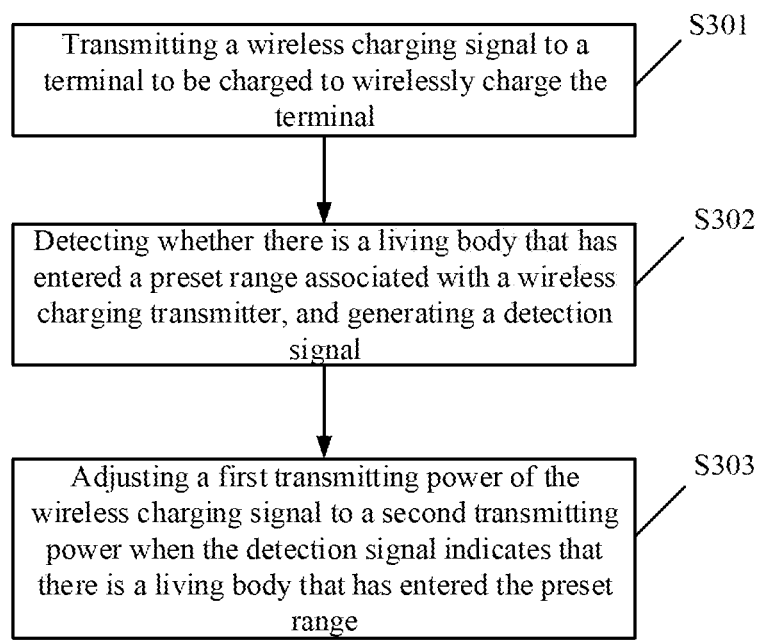
FIG. 3 illustrates a flowchart of an exemplary wireless charging method, according to some embodiments.

FIG. 3 illustrates a flowchart of an exemplary wireless charging method, according to some embodiments. The method is applied to a wireless charging transmitter. The method includes the following operations.

In S301, a wireless charging signal is transmitted to a terminal to be charged to wirelessly charge the terminal.

In S302, it is detected whether there is a living body that has entered a preset range associated with the wireless charging transmitter, and a detection signal is generated.

In S303, a first transmitting power of the wireless charging signal is adjusted to a second transmitting power when the detection signal indicates that there is a living body that has entered the preset range, the second transmitting power is smaller than the first transmitting power.

Figure 4:
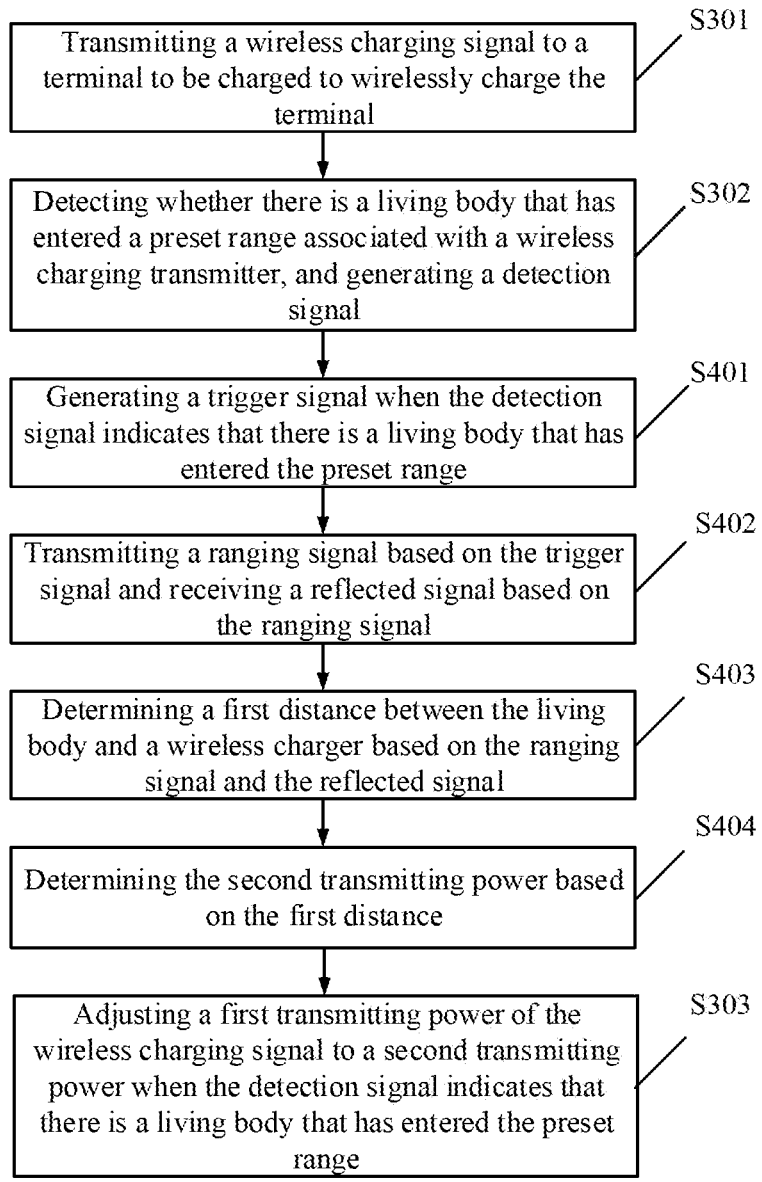
FIG. 4 illustrates a flowchart of another exemplary wireless charging method, according to some embodiments.

In some embodiments, as shown in FIG. 4, the method can further include the following operations.

In S401, a trigger signal is generated when the detection signal indicates that there is a living body that has entered the preset range.

In S402, a ranging signal is transmitted based on the trigger signal and a reflected signal based on the ranging signal is received.

In S403, a first distance between the living body and a wireless charger is determined based on the ranging signal and the reflected signal.

In S404, the second transmitting power is determined based on the first distance.

In some embodiments, the operation that the second transmitting power is determined based on the first distance further includes an operation that the second transmitting power corresponding to the first distance is determined according to preset correspondence between distances and transmitting powers.

In some embodiments, the ranging signal can include a first laser signal, the reflected signal includes a second laser signal, and the operation that a first distance between the living body and a wireless charger is determined based on the ranging signal and the reflected signal includes the following operations: the first laser signal is transmitted in a direction of the living body: the second laser signal which is reflected is received, and a first distance between the living body and the wireless charging transmitter is determined according to a transmitting time of the first laser signal and a receiving time of the second laser signal.

In other embodiments, the operation of detecting whether there is a living body that has entered a preset range associated with the wireless charging transmitter and generating a detection signal includes the following operations: a sensing signal of a living body within a preset range associated with the wireless charging transmitter is detected, and the sensing signal is converted into the detection signal.

In alternative embodiments, the operation that a sensing signal of a living body within a preset range associated with the wireless charging transmitter is detected includes an operation that an infrared signal radiated by a living body within a preset range associated with the wireless charging transmitter is detected.

The description of the above method embodiments is similar to the description of the corresponding embodiments of the wireless charging transmitter, which has similar beneficial effects as the method embodiments. The operations in the method embodiments are performed by respective components in the wireless charging transmitter. Technical details not disclosed in the method embodiments of the disclosure may be understood with reference to the description of the method embodiments of the disclosure.

The embodiments of the disclosure also provide the following examples. A WPC standard based on an electromagnetic induction wireless charging technology and an AFA standard based on a magnetic resonance technology are both short-distance wireless charging technologies applied to TX (charging transmitter) and RX (charging receiver) devices within 5 mm. To achieve long-distance wireless charging, it is necessary to increase the transmitting power of the charging transmitter, such as an RF long-distance charging technology.

And the Chinese national standard "Electromagnetic Environment Control Limit" (GB 8702-2014) stipulates a public exposure control level for each frequency (1 Hz-300 GHz), which stipulates the safety standards for a human body exposure to radiation from electric and magnetic fields, as shown in Table 1:

TABLE 1

| Frequency Range | Electric Field Intensity (E) V/m | Magnetic Field Intensity (H) A/m | Magnetic Flux Density (B) uT | Equivalent Plane Wave Power Density W/m² |
|---|---|---|---|---|
| 1~8 Hz | 8000 | 32000/f | 40000/f | — |
| 8~25 Hz | 8000 | 4000/f | 5000/f | — |
| 0.025~1.2 kHz | 200/f | 4/f | 5/f | — |
| 1.2~2.9 kHz | 200/f | 3.3 | 4.1 | — |
| 2.9~57 kHz | 70 | 10/f | 12/f | — |
| 57~100 kHz | 4000/f | 10/f | 12/f | — |
| 0.1~3 MHz | 40 | 0.1 | 0.12 | 4 |
| 3~30 MHz | 67/f | 0.17/f | 0.21/f | 12/f |
| 30~3000 MHz | 12 | 0.032 | 0.04 | 0.4 |
| 3000~15000 MHz | 0.22 f | 0.00059 f | 0.00074 f | f/7500 |
| 15~300 GHz | 27 | 0.037 | 0.092 | 2 |

In order to meet the safety standards of a human body exposed to radiation from electric and magnetic fields, the embodiments of the disclosure provide a living body recognition and distance detection solution based on RF long-distance wireless charging, which solves the safety problem of received radiation from a handheld device to a human body during the RF long-distance wireless charging. The solution of the embodiments of the disclosure considers the following aspects.

First, a living body detection system is provided in a TX device for RF long-distance wireless charging.

Second, core modules of the living body detection system include an infrared detection module, a laser ranging module and a signal processing module.

Third, a response time of the living body detection system is controlled in a millisecond level.

Fourth, an effective operating range of living body detection may be: 5 m*5 m*4 m, that is, detection is performed within a space range consisting of a width of 5 m, a length of 5 m and a height of 4 m in all directions by 360°.

Fifth, dynamic power adjustment is: adjusting a TX transmitting power according to the state of living body detection and a relative distance between a living body and a transmitter, so that the transmitting power meets safety standards of radiation exposed to the human body, and a safety distance may be set to 2.5 m.

After the living body monitoring system starts to operate, the infrared detection module in TX monitors an indoor temperature changes in real time to determine whether there is a living body. If there is a living body, the infrared detection module in TX feedbacks a signal to the signal processing module, the signal processing module controls the laser ranging module to start to operate, and the laser ranging module detects a distance between the indoor living body and an energy transmission system, and determines whether a person is within an unsafe range, that is, less than 2.5 m. If the person is within the unsafe range, the signal processing module adjusts the transmitting power of the transmitting system TX to ensure that a human body receives RF radiation within a safety standard range. At this case, the system operates in a safe state.

Figure 5:
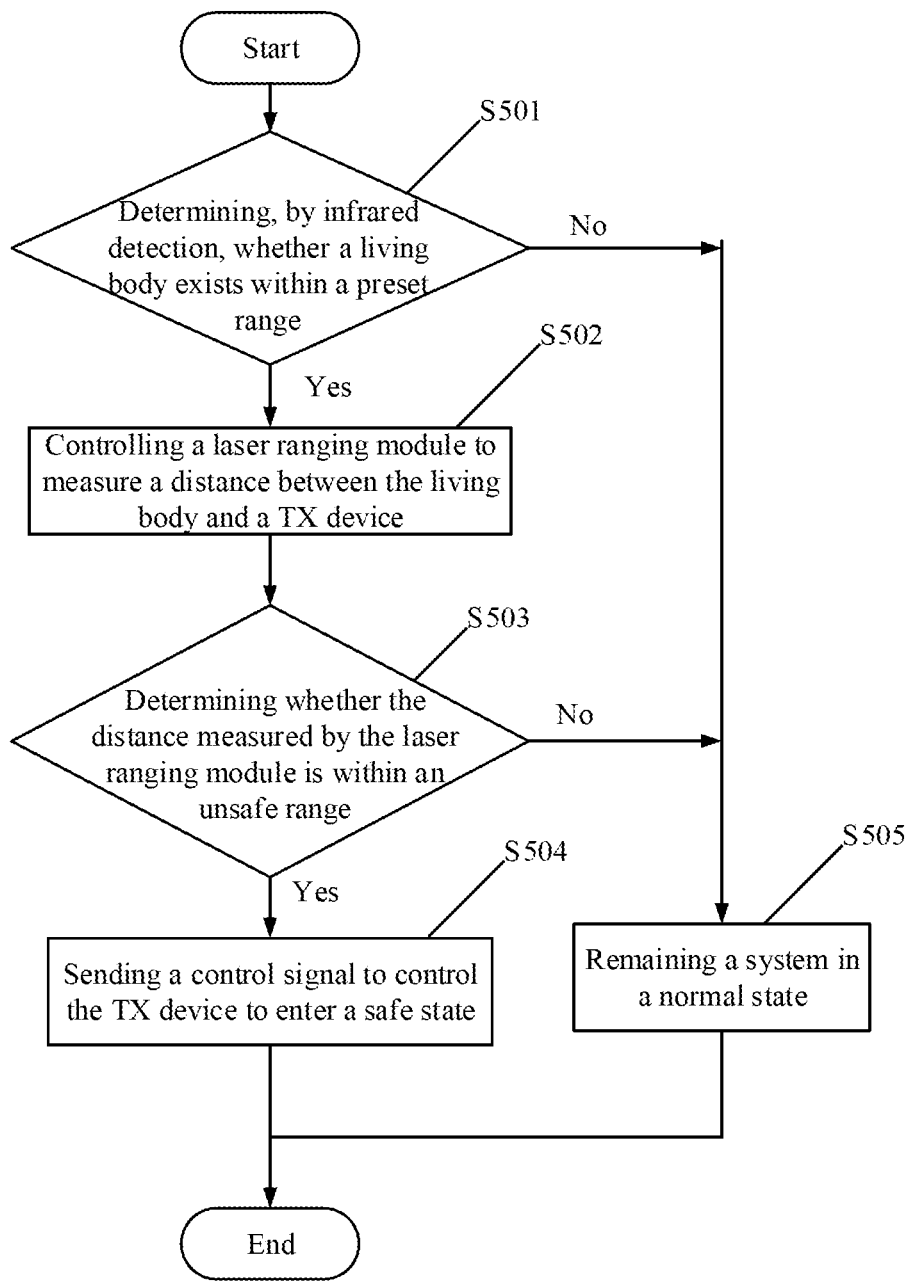
FIG. 5 illustrates a flowchart of still another exemplary wireless charging method, according to some embodiments.

This may be achieved by the operations shown in FIG. 5.

In S501, it is determined by infrared detection whether a living body exists within a preset range.

In S502, if yes, a laser ranging module is controlled to measure a distance between the living body and a TX device.

In S503, it is determined whether the distance measured by the laser ranging module is within an unsafe range.

In S504, if yes, a control signal is sent to control the TX device to enter a safe state. The safe state here means reducing a transmitting power to a safe range harmless to a human body.

In S505, if no living body is detected, or the distance between the living body and the TX device is within a safe range, a system remains in a normal state. The normal state here means a normal charging state for long-distance wireless charging of the RX device.

In this way, the long-distance and high-power wireless charging requirements for mobile phones, JOT devices, and the like, can be met. Further, the safety requirements for a human body can be met, thereby reducing the radiation damage to the human body from charging devices.

The technical solution provided by the embodiments of the disclosure may include the following beneficial effects: by means of the technical solution of the embodiments of the disclosure, it is detected whether there is a living body within a preset range of a wireless charging transmitter to adjust a transmitting power of a transmitting component correspondingly. In this way, when no living body is detected, the wireless charging transmitter may wirelessly charge terminal to be charged by using a higher transmitting power namely a first transmitting power, thereby achieving wireless charging of more charged devices in a long distance and ensuring the overall charging efficiency of the wireless charging transmitter. When a living body is detected, the transmitting power is adjusted to a lower second transmitting power, thereby improving the safety of long-distance wireless charging and reducing the probability of exposure of the living body to a high-power wireless Radio Frequency (RF) signal.

Figure 6:
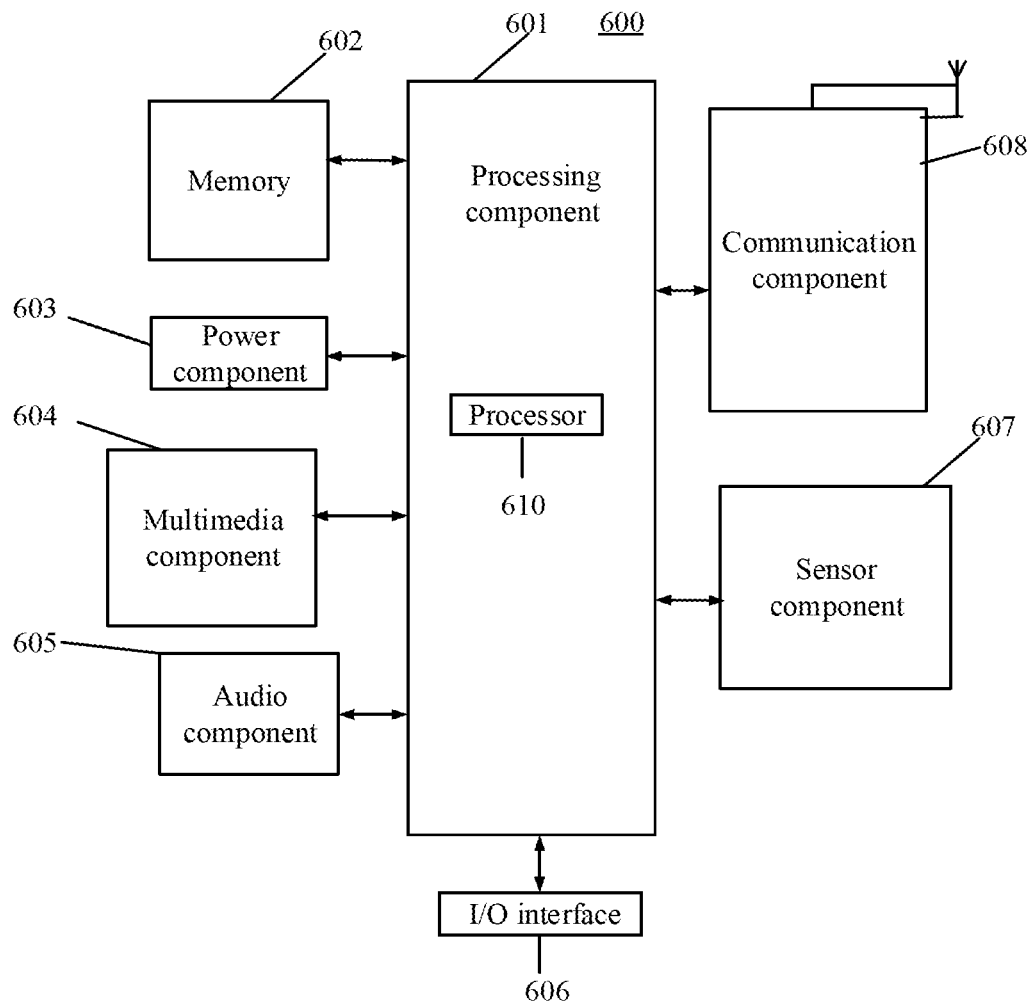
FIG. 6 illustrates a solid structure block diagram of an exemplary wireless charging device, according to some embodiments.

FIG. 6 is a block diagram illustrating an exemplary wireless charging device 600 according to some embodiments. The device is applied to a terminal device. Referring to FIG. 6, the device 600 may include one or more of the following components: a processing component 601, a memory 602, a power component 603, a multimedia component 604, an audio component 605, an Input/Output (I/O) interface 606, a sensor component 607, and a communication component 608.

The processing component 601 typically controls overall operations of the device 600, such as operations associated with display, telephone calls, data communications, camera operations, and recording operations. The processing component 601 may include one or more processors 610 to execute instructions to perform all or part of the steps in the above described methods. Moreover, the processing component 601 may further include one or more modules which facilitate the interaction between the processing component 601 and other components. For example, the processing component 601 may include a multimedia module to facilitate the interaction between the multimedia component 604 and the processing component 601.

The memory 610 is configured to store various types of data to support the operation of the device 600. Examples of such data include instructions for any applications or methods operated on the device 600, contact data, phonebook data, messages, pictures, video, etc. The memory 602 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 603 provides power to various components of the device 600. The power component 603 may include: a power management system, one or more power sources, and any other components associated with the generation, management and distribution of power in the device 600.

In addition, the power component 603 further includes a wireless charging transmitter for sending wireless charging signals to other terminal devices. The wireless charging transmitter is configured to perform the method provided in any one of the foregoing embodiments.

The multimedia component 604 includes a screen providing an output interface between the device 600 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 604 includes a front image acquisition component and/or a rear image acquisition component. The front image acquisition component and/or the rear image acquisition component may receive an external multimedia datum while the device 600 is in an operation mode, such as a photographing mode or a video mode. Each of the front image acquisition component and/or the rear image acquisition component may be a fixed optical lens system or have focus and optical zoom capability.

The audio component 605 is configured to output and/or input audio signals. For example, the audio component 605 includes an audio acquisition component (MIC) configured to receive an external audio signal when the device 600 is in an operation mode, such as a call mode, a recording mode, and a voice recognition mode. The received audio signal may be further stored in the memory 610 or transmitted via the communication component 608. In some embodiments, the audio component 605 further includes a speaker to output audio signals.

The I/O interface 606 provides an interface between the processing component 601 and peripheral interface modules, such as a keyboard, a click wheel, or buttons. The buttons may include, but are not limited to, a home button, a volume button, a starting button, and a locking button.

The sensor component 607 includes one or more sensors to provide status assessments of various aspects of the device 600. For example, the sensor component 607 may detect an open/closed status of the device 600, and relative positioning of components. For example, the component is the display and the keypad of the device 600. The sensor component 607 may also detect a change in position of the device 600 or a component of the device 600, a presence or absence of user contact with the device 600, an orientation or an acceleration/deceleration of the device 600, and a change in temperature of the device 600. The sensor component 607 may include a proximity sensor configured to detect the presence of nearby objects without any physical contact. The sensor component 607 may also include a light sensor, such as a Complementary Metal Oxide Semiconductor (CMOS) or Charge Coupled Device (CCD) image sensor, for use in imaging applications. In some embodiments, the sensor component 607 may also include an acceleration sensor, a gyroscope sensor, a magnetic sensor, a pressure sensor, or a temperature sensor.

The communication component 608 is configured to facilitate communication, wired or wirelessly, between the device 600, and other devices. The device 600 may access a wireless network based on a communication standard, such as WiFi, 2G or 3G, or a combination thereof. In one exemplary embodiment, the communication component 608 receives a broadcast signal or broadcast associated information from an external broadcast management system via a broadcast channel. In one exemplary embodiment, the communication component 608 further includes an Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, or other technologies.

In exemplary embodiments, the device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements.

In exemplary embodiments, there is also provided a non-transitory computer-readable storage medium including instructions, such as included in the memory 602, executable by the wireless charging transmitter in the power component 603 of the device 600 to complete the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus, A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g.; an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for wireless charging, applied to a wireless charging transmitter, the method comprising:
    transmitting a wireless charging signal to a terminal to be charged in order to wirelessly charge the terminal;
    detecting whether there is a living body that has entered a preset range associated with the wireless charging transmitter and determining, when detecting that a living body has entered the preset range, a direction or position of the living body and correspondingly generating a detection signal carrying direction or position information of the living body;
    generating a trigger signal when the detection signal indicates that the living body has entered the preset range, the trigger signal comprising the direction or position information of the living body;
    transmitting, by using the direction or position information of the living body as an initial position based on the trigger signal, a ranging signal and receiving a reflected signal of the ranging signal, determining a first distance between the living body and the wireless charging transmitter based on the ranging signal and the reflected signal; and determining a second transmitting power based on the first distance; and
    adjusting a first transmitting power of the wireless charging signal to the second transmitting power when the detection signal indicates that there is a living body that has entered the preset range, where the second transmitting power is less than the first transmitting power.

2. The method according to claim 1, wherein determining the second transmitting power based on the first distance comprises:
    determining the second transmitting power corresponding to the first distance according to preset correspondence between distances and transmitting powers.

3. The method according to claim 1, wherein the ranging signal is a first laser signal, the reflected signal is a second laser signal, and determining the first distance between the living body and the wireless charger transmitter based on the ranging signal and the reflected signal further comprises:

transmitting the first laser signal in the direction of the living body;
receiving the second laser signal which is reflected; and
determining the first distance between the living body and the wireless charging transmitter according to a transmitting time of the first laser signal and a receiving time of the second laser signal.

4. The method according to claim 1, wherein detecting whether there is a living body that has entered the preset range associated with the wireless charging transmitter and generating the detection signal further comprises:

detecting a sensing signal of the living body within the preset range associated with the wireless charging transmitter; and
converting the sensing signal into the detection signal.

5. The method according to claim 4, wherein detecting the sensing signal of the living body within the preset range associated with the wireless charging transmitter further comprises:

detecting an infrared signal radiated by the living body within the preset range associated with the wireless charging transmitter.

6. A non-transitory computer-readable storage medium having stored therein instructions that, when executed by a wireless charging transmitter, causes the wireless charging transmitter to perform a method for wireless charging, the method comprising:

transmitting a wireless charging signal to a terminal to be charged in order to wirelessly charge the terminal;
detecting whether there is a living body that has entered a preset range associated with the wireless charging transmitter and determining, when detecting that a living body has entered the preset range, a direction or position of the living body and correspondingly generating a detection signal carrying direction or position information of the living body;
generating a trigger signal when the detection signal indicates that the living body has entered the preset range, the trigger signal comprising the direction or position information of the living body;
transmitting, by using the direction or position information of the living body as an initial position based on the trigger signal, a ranging signal and receiving a reflected signal of the ranging signal, determining a first distance between the living body and the wireless charging transmitter based on the ranging signal and the reflected signal, and determining a second transmitting power based on the first distance; and
adjusting a first transmitting power of the wireless charging signal to the second transmitting power when the detection signal indicates that there is a living body that has entered the preset range, where the second transmitting power is less than the first transmitting power.

7. The non-transitory computer-readable storage medium according to claim 6, wherein determining the second transmitting power based on the first distance further comprises:

determining the second transmitting power corresponding to the first distance according to preset correspondence between distances and transmitting powers.

8. The non-transitory computer-readable storage medium according to claim 6, wherein the ranging signal is a first laser signal, the reflected signal is a second laser signal, and determining the first distance between the living body and the wireless charger transmitter based on the ranging signal and the reflected signal further comprises:

transmitting the first laser signal in the direction of the living body;
receiving the second laser signal which is reflected; and
determining the first distance between the living body and the wireless charging transmitter according to a transmitting time of the first laser signal and a receiving time of the second laser signal.

9. The non-transitory computer-readable storage medium according to claim 6, wherein detecting whether there is a living body that has entered the preset range associated with the wireless charging transmitter and generating the detection signal further comprises:

detecting a sensing signal of the living body within the preset range associated with the wireless charging transmitter; and
converting the sensing signal into the detection signal.

10. The non-transitory computer-readable storage medium according to claim 9, wherein detecting the sensing signal of the living body within the preset range associated with the wireless charging transmitter further comprises:

detecting an infrared signal radiated by the living body within the preset range associated with the wireless charging transmitter.

11. A wireless charging transmitter, comprising:

a transmitting component that is configured to transmit a wireless charging signal to a terminal to be charged in order to wirelessly charge the terminal;
a detection component that is configured to detect whether there is a living body that has entered a preset range associated with the wireless charging transmitter and determine, when detecting that a living body has entered the preset range, a direction or position of the living body and correspondingly generate a detection signal carrying direction or position information of the living body;
an adjustment component that is coupled to the transmitting component and configured to adjust a first transmitting power of the transmitting component to a second transmitting power when the detection signal indicates that a living body that has entered the preset range, where the second transmitting power is less than the first transmitting power, wherein the adjustment component is further configured to generate a trigger signal when the detection signal indicates that the living body has entered the preset range, and send the trigger signal to a ranging component, the trigger signal comprising the direction or position information of the living body; and
the ranging component, connected to the adjustment component and configured to: transmit, by using the direction or position information of the living body as an initial position based on the trigger signal, a ranging signal and receive a reflected signal of the ranging signal, and determine a first distance between the living body and the wireless charging transmitter based on the ranging signal and the reflected signal,
wherein the adjustment component is further configured to determine the second transmitting power based on the first distance.

12. The wireless charging transmitter according to claim 11, wherein the ranging signal is a first laser signal, the reflected signal is a second laser signal, and the ranging component further comprises:

a laser generator that is configured to transmit the first laser signal in the direction of the living body;

a laser receiver that is configured to receive the second laser signal which is reflected; and a processing unit that is configured to determine the first distance between the living body and the wireless charging transmitter according to a transmitting time of the first laser signal and a receiving time of the second laser signal.

13. The wireless charging transmitter according to claim 11, wherein the adjustment component is further configured to determine the second transmitting power corresponding to the first distance according to preset correspondence between distances and transmitting powers.

14. The wireless charging transmitter according to claim 11, wherein the detection component further comprises:

a detection sensor that is configured to detect a sensing signal of the living body within the preset range associated with the wireless charging transmitter; and a signal conversion circuit that is connected to the detection sensor and configured to convert the sensing signal into the detection signal.

15. The wireless charging transmitter according to claim 14, wherein the detection sensor further comprises:

an infrared sensor that is configured to detect an infrared signal radiated by the living body within the preset range associated with the wireless charging transmitter.

* * * * *